June 16, 1925.                    E. S. ERHARD                    1,542,681
WHEEL
Filed April 25, 1924
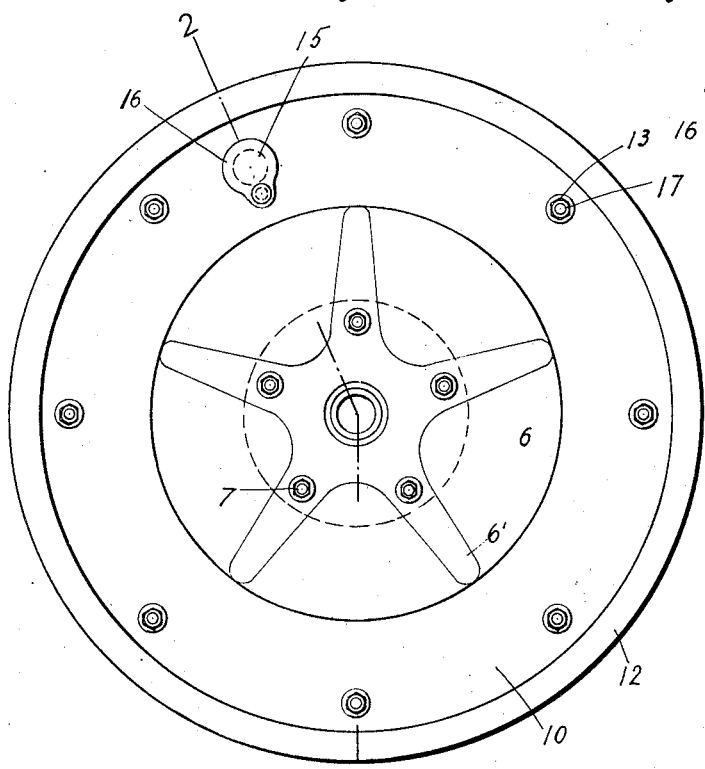
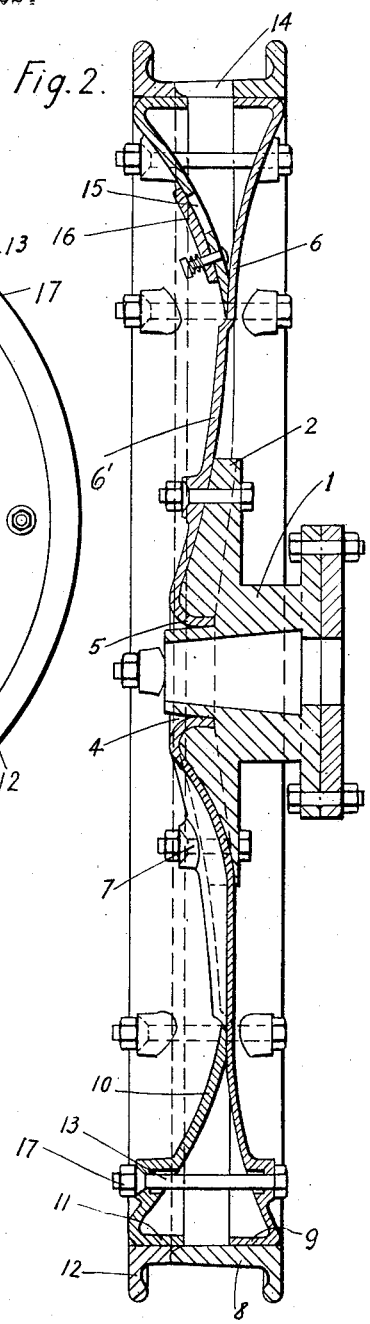
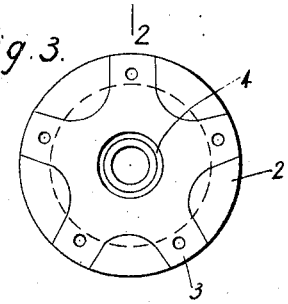
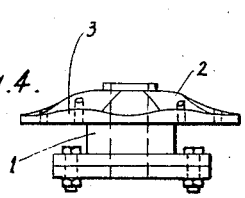
E. S. Erhard
INVENTOR
O. Thalmann
BY Victor J. Evans
ATTORNEY
WITNESS:

Patented June 16, 1925.

1,542,681

UNITED STATES PATENT OFFICE.

ELMER S. ERHARD, OF CURWENSVILLE, PENNSYLVANIA.

WHEEL.

Application filed April 25, 1924. Serial No. 709,013.

*To all whom it may concern:*

Be it known that I, ELMER S. ERHARD, a citizen of the United States, residing at Curwensville, in the county of Clearfield and State of Pennsylvania, have invented new and useful Improvements in Wheels, of which the following is a specification.

This invention relates to improvements in vehicle wheels, the general object of the invention being to provide a wheel of great strength and of attractive appearance and one in which the tire can be easily and quickly put in place on the wheel and removed therefrom.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a face view of the improved wheel.

Figure 2 is a section on line 2—2 of Figure 1.

Figure 3 is a view of the hub member.

Figure 4 is an elevation of such member.

In these views, 1 indicates the hub member of the wheel which is formed with an annular flange 2 which has its outer face corrugated, as shown at 3. The said face, adjacent the central opening, is provided with an annular groove 4, the outer wall of which is rounded to receive the inwardly curved central part 5 of the main disc 6 of the wheel. This disc is also corrugated, the corrugations being made to conform to the corrugations 3 of the flange 2 and the disc is fastened to said flange by the bolts 7. One portion of a sectional rim 8 is fastened to the flange 9 of the disc 6 and the ring member 10 has its flange 11 connected to the other section 12 of the rim so that when the disc and ring member are bolted together by the bolts 13 a complete rim will be formed to carry the tire.

The abutting edges of the two sections of the rim are shaped to firmly engage each other, when the two sections are brought together. The ring member 10 has its inner edge beveled and abuts the ends of the corrugations 6' formed on the disc 6, said ends forming shoulders against which the member 10 abuts. Said member 10 is of curved construction in cross section and the ring member and disc diverge from each other so that the sections of the rim are properly placed when the parts are bolted together. The section 8 is provided with a notch 14 for receiving the valve stem and member 10 is provided with an opening 15 through which the valve stem can be reached for filling the tire with air. This hole is normally closed by a spring actuated flap 16. As the valve stem lies within the space formed by the member and disc it is protected from dirt and dust and no dust cap is required. The flap 16 prevents dirt and dust from entering the space. When it is desired to remove the tire it is simply necessary to take off the nuts 17 from the bolts 13 and remove the member 10 and the section 12. By providing the corrugations the wheel is greatly strengthened and by permitting the central part 5 to engage the groove 4 in the hub part much strain is taken off the bolts 7 and the corrugations also help to remove strain from the bolts.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A wheel of the class described comprising a hub member, a main disc bolted to the same, an annular groove in the hub member and the said disc having an inwardly curved central part for engaging the groove, a rim section carried by the disc, a ring member bolted to the outer part of the first disc and a rim section carried by the ring.

2. A wheel of the class described comprising a hub member formed with a flange having a corrugated outer face, said flange having an annular groove with a curved outer wall adjacent its center, a disc corrugated to fit the corrugations on the flange and having an inwardly curved central part for engaging the groove, bolts connecting the disc with the flange, a rim section carried by the disc, a ring member having its inner edge abutting the ends of the corrugations on the disc, a rim section carried by the ring member and bolts for connecting the disc and ring member together.

3. A wheel of the class described comprising a hub member formed with a flange having a corrugated outer face, said flange having an annular groove with a curved outer wall adjacent its center, a disc corrugated to fit the corrugations on the flange and having an inwardly curved central part for engaging the groove, bolts connecting the disc with the flange, a rim section carried by the disc, a ring-member having its inner edge abutting the ends of the corrugations on the disc, a rim section carried by the ring member and bolts for connecting the disc and ring member together, said disc and ring member forming a space between them into which the valve stem projects, an opening in the ring member for providing access to the stem and a flap for covering the opening.

In testimony whereof I affix my signature.

ELMER S. ERHARD.